(12) United States Patent
Crawshaw et al.

(10) Patent No.: US 12,341,772 B2
(45) Date of Patent: Jun. 24, 2025

(54) MANAGEMENT OF PRIVATE NETWORKS OVER MULTIPLE LOCAL NETWORKS

(71) Applicant: Tailscale Inc., Toronto (CA)

(72) Inventors: David J. Crawshaw, Berkeley, CA (US); Avery Pennarun, Montreal (CA); David Anderson, Victoria (CA)

(73) Assignee: Tailscale, Inc.

( * ) Notice: Subject to any disclaimer, the term of this patent is extended or adjusted under 35 U.S.C. 154(b) by 396 days.

(21) Appl. No.: 17/552,209

(22) Filed: Dec. 15, 2021

(65) Prior Publication Data

US 2023/0006998 A1 Jan. 5, 2023

Related U.S. Application Data

(60) Provisional application No. 63/218,016, filed on Jul. 2, 2021.

(51) Int. Cl.
*H04L 9/40* (2022.01)
(52) U.S. Cl.
CPC ...... *H04L 63/0876* (2013.01); *H04L 63/0236* (2013.01); *H04L 63/0428* (2013.01)
(58) Field of Classification Search
None
See application file for complete search history.

(56) References Cited

U.S. PATENT DOCUMENTS

| | | | |
|---|---|---|---|
| 6,307,843 B1* | 10/2001 | Okanoue | H04L 45/02 370/312 |
| 6,331,984 B1* | 12/2001 | Luciani | H04L 61/255 370/503 |
| 6,886,103 B1* | 4/2005 | Brustoloni | H04L 61/2564 713/160 |
| 7,468,956 B1* | 12/2008 | Leelanivas | H04L 45/04 370/255 |
| 8,254,305 B1* | 8/2012 | Breau | H04L 61/4541 370/315 |
| 9,838,302 B1* | 12/2017 | Sears | H04L 45/28 |
| 10,708,774 B2* | 7/2020 | Koo | H04W 12/068 |
| 11,290,434 B2* | 3/2022 | Moritomo | H04L 63/123 |
| 2004/0042456 A1* | 3/2004 | Dittmann | H04L 47/50 370/428 |
| 2005/0010668 A1* | 1/2005 | Chen | H04L 61/2514 709/227 |
| 2011/0206036 A1* | 8/2011 | DeWeese | H04M 11/04 370/352 |

(Continued)

FOREIGN PATENT DOCUMENTS

EP 1093254 A2 * 4/2001 ......... H04L 12/4679

*Primary Examiner* — Sandarva Khanal

(57) ABSTRACT

Described herein are systems, methods, and software to manage private networks for computing elements. In one example, a computing element on a first local network communicates a request to a coordination service to join a private network. The computing element further receives communication information associated with other computing elements in the private network, wherein the communication information permits the computing element to communicate with other computing elements in the private network that connect to the internet using second local networks. The computing element further advertises the computing elements in the first local network as though the other computing elements are connected to the first local network.

20 Claims, 7 Drawing Sheets

(56) References Cited

U.S. PATENT DOCUMENTS

| | | |
|---|---|---|
| 2012/0328101 A1* | 12/2012 | Lakshminarayanan ...................... H04L 63/0823 380/258 |
| 2016/0028596 A1* | 1/2016 | Lund .................... H04L 69/164 709/224 |
| 2016/0380789 A1* | 12/2016 | Gunnalan ........... H04L 61/5007 709/228 |
| 2017/0207963 A1* | 7/2017 | Mehta ................... H04L 1/0002 |
| 2018/0013717 A1* | 1/2018 | Babaria .................. H04L 45/04 |
| 2018/0337785 A1* | 11/2018 | Sanciangco ............. H04L 63/10 |

* cited by examiner

US 12,341,772 B2

MANAGEMENT OF PRIVATE NETWORKS OVER MULTIPLE LOCAL NETWORKS

RELATED APPLICATIONS

This application claims the benefit of, and priority to, U.S. Provisional Patent Application No. 63/218,016, entitled "MANAGEMENT OF PRIVATE NETWORKS OVER MULTIPLE LOCAL NETWORKS", filed Jul. 2, 2021, which is hereby incorporated by reference in its entirety for all purposes.

TECHNICAL BACKGROUND

In computing networks, physical and virtual computing systems can include applications and services that require communications with other computing systems to provide desired operations. For example, an application on a first computing system may require data from a storage server located on a second computing system. To provide the communication, the data payload may be placed in a network packet and transferred to the required computing system. However, although network packets provide a method of communication between computing systems, difficulties often arise in maintaining security and configuration information to support the communications.

To overcome some of the deficiencies presented in securing network communications, various technologies have been developed. These technologies include virtual local area networks (VLANs), encryption for the data payload within the data packets, amongst other similar security procedures. Yet, while these security technologies may provide additional security over unprotected network packets, configuring individual networks can be difficult and cumbersome. These difficulties are compounded when a network includes different types of computing systems with different firewall and other security measures.

SUMMARY

The technology described herein manages a private network over multiple local networks. In one implementation, a method of operating a computing element in a first local network includes communicating a request to a coordination service to join a private network. The method further provides receiving communication information associated with one or more other computing elements in the private network, wherein the communication information permits the computing element to communicate with one or more other computing elements in the private network, and wherein the one or more other computing elements connect to the internet using one or more second local networks. The method also includes advertising the one or more other computing elements in the first local network as though the one or more other computing elements are connected to the first local network.

DETAILED DESCRIPTION

Figure 1:
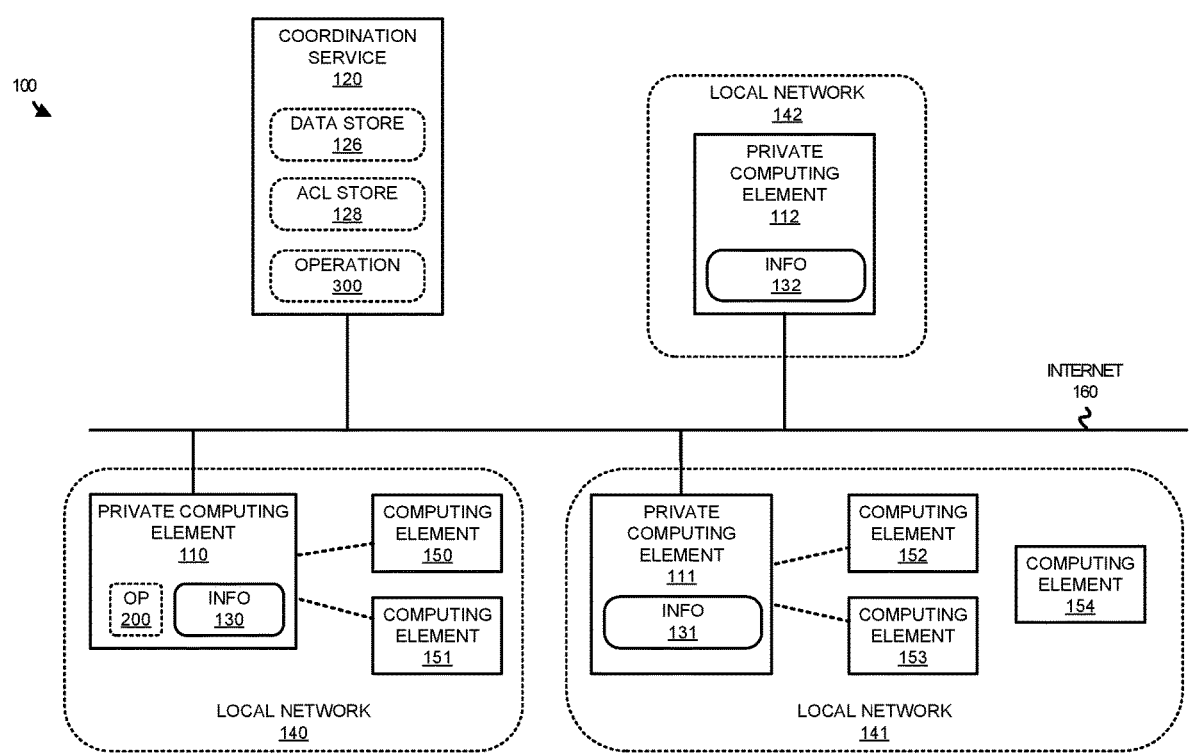
FIG. 1 illustrates a computing environment to manage a private network across multiple local networks according to an implementation.

The following discussion presents operations and techniques to manage private networks across multiple local networks. In some implementations, organizations may require computing elements across multiple local networks to exchange data, including images, video, spreadsheets, or other some other data or data structure. For example, an organization may deploy a server in a first local network, such as a local network at the headquarters for the organization, while other user computing systems may request and obtain data from the server to provide various operations.

Here, to manage the connectivity between computing elements on different local networks and to establish a private network between the computing elements, a coordination service is provided that maintains permissions for computing elements to join and communicate in a private network. In one implementation, a computing element may generate a request to the coordination service to join a private network. This request may include information about the user of the computing element, information about the computing element itself (hardware, operating system, and other similar information), or some other information about the computing element or user thereof. In response to the request, the coordination service may identify communication information associated with the request and provide the communication information to the requesting computing element. The communication information may include addressing information for one or more other computing elements in the private network, encryption information for the one or more other computing elements, permissions or permitted communications between the computing elements, or some other information associated with the communication between computing elements in the private network. In some examples, the communication information may be determined based on rules, wherein the rules may define users or user types that are permitted to communicate, device types that are permitted to communicate, or some information.

As an example, a computing element may generate a request to join a private network with other computing elements distributed across multiple local networks. In the request, the computing element may provide credential information about the user, device information, or some other information. In response to the request, the coordination service may determine communication information for other computing elements based on rules identified for the joining computing element. When the request is received, the coordination service may identify rules associated with the newly connecting device and determine communication information for other computing elements based on the rules. The communication information may include IP addressing information, media access control (MAC) addressing information, port information, encryption information, or some other information. Once the information is identified, the communication information may be provided to the joining computing element. In some examples, the communication information may include a unique IP address that is allocated to each reachable computing element in the private network.

In some implementations, the requesting computing element may operate on a local network that permits computing elements to identify and communicate with other computing elements on the same local network. For example, a home network may permit computers and other devices to identify and exchange data between computers on the same network. As a result, in addition to advertising itself in the local home network, a computing element that joins the private network via the coordination service may further advertise computing elements on other local networks outside of the home network. To communicate with the computing elements on other networks, the local computing elements may communicate packets to one or more specific ports on the registered computing element on the private network, the registered computing element may encapsulate the packets, update addressing in the packets for the private network, and may forward the encapsulated packet over the internet toward the destination computing element. In some examples, in advertising the other computing elements, the computing element may use zero-configuration networking, which can provide computing element identifier information, IP addressing information, port information, and other information about the computing element in a local network.

In some implementations, the registered computing element may advertise multiple IP addresses, wherein each of the IP addresses correspond to a different computing element. For example, a first IP address may correspond to the registered computing element, while one or more additional IP addresses correspond to one or more computing elements on other local computing networks. When a packet is received by the registered computing element using a destination IP address that corresponds to a computing element in another network, the registered computing element may update addressing in the packet (e.g., replace the local IP address with a unique address allocated by the coordination service), encapsulate the packet, and forward the packet toward the destination computing element.

In some examples, when a computing element is registered with the coordination service, the computing element may provide information about other computing elements on the local network. Advantageously, although the other computing elements may not register directly with the private network using the coordination service, the other computing elements may communicate in the private network via the registered computing element. For example, in a home network, a desktop computer may be registered to a private network using the coordination service and permit one or more other devices on the network to communicate with the private network without directly registering with the private network. Communication information about the one or more other devices may also be provided to other registered computing elements on other local networks. In addition to providing communication information about the registering computing element to the coordination service, the registering computing element may further provide information about other computing elements on the network (identifier, available ports, etc.). This may permit the computing elements on other local networks to advertise these computing elements in their own local network.

FIG. 1 illustrates a computing environment 100 to manage a private network across multiple local networks according to an implementation. Computing environment 100 includes coordination service 120 and local networks 140-142, which are coupled via internet 160. Coordination service 120 further includes data store 126, access control lists (ACL) store 128, and provides operation 300 that is further described below with respect to FIG. 3. Local networks 140-142 further includes private computing elements 110-112, and computing elements 150-154. Private computing elements maintain information 130-132 that corresponds to communication information obtained from the coordination service, and private computing element 110 provides operation 200 that is further described below with respect to FIG. 2. Private computing elements 110-112 and computing elements 150-154 may comprise desktop computers, laptop computers, smartphones, tablets, routers or other gateways, virtual machines, containers, or some other computing element.

In deploying a private network, coordination service 120 may be used to maintain and distribute communication rules for computing elements to join the private network. Data store 126 may be used to maintain information about the computing elements in the network, while ACL store 128 may maintain rules for what computing elements can join a private network and what communications are permitted between the computing elements of a private network. Here, private computing elements 110-112 may represent computing elements that are joining the same private network. To join the network a computing element, such as private computing element 110 may provide a request to coordination service 120 to join the private network. In response to the request, coordination service 120 may determine permissions for the private computing element and provide communication information associated with the permissions to private computing element 110. The communication information may include addressing information associated with other computing elements in the private computing network, encryption information associated with other computing elements in the private computing network, or some other information associated with the addressing information. The communication information corresponds to other computing elements for which the registering computing element can communicate. For example, when private computing element 110 registers with coordination service 120, the rules may permit private computing element 110 to communicate with private computing element 110, but not communicate with private computing element 112. Accordingly, communication information may be provided to private computing element 110 that includes addressing and other information for private computing element 111, while no information is provided about private computing element 112.

Here, in addition to the registering computing element, other computing elements on a local network may be permitted to communicate using the communication information from the coordination service. When private computing element 110 registers with coordination service 120, private computing element 110 may be provided with communication information to communicate with resources on private computing element 111. Additionally, the communication information may permit, private computing element 110 to communicate with computing elements 152-153 through private computing element 111. In communicating with computing elements 152-153, private computing elements 110 may use addressing unique to a computing element of computing elements 152-153 to communicate with the computing elements. For example, private computing element 110 may generate a packet that uses a unique private IP address allocated to computing element 152 by coordination service 120 as the destination. Once generated, private computing element 110 may encapsulate the packet using public addressing information for private computing element 111 over internet 160 and forward the packet to the private computing element 111. In response to receiving the packet, private computing element 111 may decapsulate the packet and forward the packet to computing element 152. In some implementations, private computing element 111 may modify the addressing of the packet to provide the packet to computing element 152 on the local network. This modification may include modifying the IP address of the packet, the port of the packet, or some other information associated with the packet.

Like communicating with computing elements 152-153 on other networks, private computing element 110 may permit computing elements 150-151 to send and receive data from other computing elements on the computing network. In some implementations, the communication information provided by coordination service 120 may permit private computing element 110 to advertise other computing elements in the private network to computing elements 150-151 as though the computing elements are in local network 140. For example, private computing element 111 may provide communication information about computing elements 152-153 to coordination service 120. The communication information may then be provided to private computing element 110, wherein the communication information may permit private computing element 110 to advertise computing elements 152-153 as though the computing elements are in the local network. In some implementations, private computing element 110 may advertise port numbers to communicate with computing elements 152-152 using private computing element 110, device information about the computing elements, or some other information about the computing elements. If a communication is received at private computing element 110 at a port advertised, private computing element 110 may modify addressing in the packet to support the private network (e.g., use unique IP addresses allocated to the computing elements, including computing elements 150-153), may encapsulate the packet to be communicated over internet 160, or may provide some other operation. Once encapsulated, the packet may be communicated from private computing element 110 to private computing element 111, wherein private computing element 111 may decapsulate the packet, modify addressing parameters (e.g., IP addresses, MAC addresses, etc.) to support the local network, and forward the packet to the destination computing element.

In some implementations, when advertising the computing elements in the network, a private computing element may obtain multiple local IP addresses from the router or other allocation service. For example, rather than advertising a single IP address for private computing element 110, private computing element 110 may advertise additional local IP addresses for other computing elements in local networks 141-142. Thus, rather than appearing as a single computing element, private computing element may appear as multiple computing elements on the local network. When a communication is required, such as from computing element 150 to computing element 152, computing element 150 may use a local IP address advertised by private computing element 110 for computing element 152. Once received by private computing element 110, private computing element 110 may translate the local IP address to an IP address allocated by coordination service 120 for use in the private network. For example, a local address may comprise 192.0.1.8, while the address allocated by coordination service 120 may comprise 76.3.4.5. Once translated, the packet communication can be encapsulated, and public addressing may be used to communicate the packet over internet 160 to private computing element 111. Once received by private computing element 111, the packet can be decapsulated using the encryption information provided by coordination service 110. Private computing element 110 may identify the private network IP address allocated by coordination service 120 to computing element 152 and may translate the private network IP address to a local network IP address for computing element 152 in local network 141. Once translated, the packet may be communicated to computing element 152.

Figure 2:
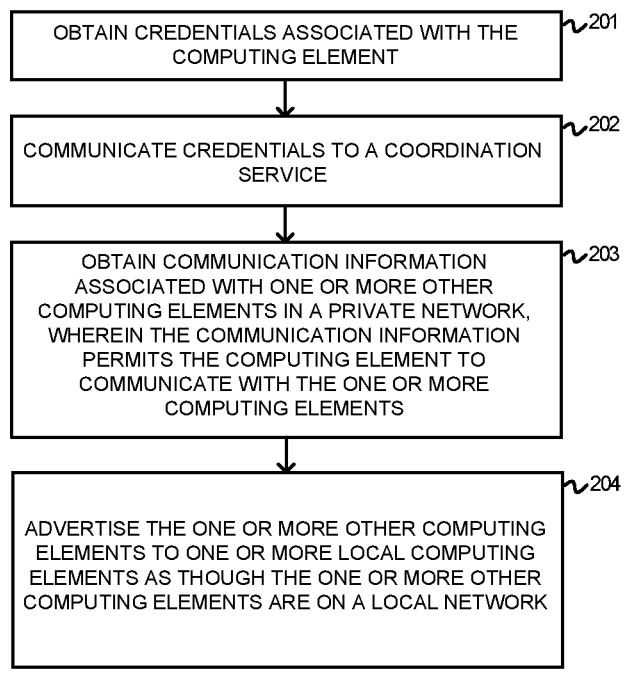
FIG. 2 illustrates an operation of a computing element to join a private network according to an implementation.

FIG. 2 illustrates an operation 200 of a computing element to join a private network according to an implementation. The steps of operation 200 are referenced parenthetically in the paragraphs that follow with reference to systems and elements of computing environment 100 of FIG. 1.

As depicted, operation 200 includes (201) obtaining credentials associated with the computing element and (202) communicating the credentials to a coordination service. Once communicated, the operation further obtains (203) communication information associated with one or more other computing elements in the private network, wherein the communication information permits the computing element to communicate with the one or more other computing elements. The communication information may include addressing information, encryption information, or some other type of information permitting the communication with other computing elements in the private computing network. In some examples, such as that in computing environment 100, computing elements in the private network may be located on multiple local networks. For example, a first local network may comprise a home local network, while a second computing network may comprise a work network or second home network.

After receiving the communication information, operation 200 advertises (204) the one or more computing elements from the other local networks to the local computing elements as though the one or more other computing elements are on the local network. For example, when private computing element 110 joins a private network, coordination service 120 may provide communication information to private computing element 110 that permits communication with computing elements registered to the network (private computing elements 111-112) and computing elements permitted to communicate over the registered computing elements. Here, while computing elements 152-153 are permitted to communicate using private computing element 111, computing element 154 is not permitted to communicate using private computing element 154. This may mean that computing element 154 does not receive the advertisement of other computing elements, that computing element 154 is not advertised to other computing elements of the private network.

When a communication is desired by computing element 150 to computing element 152, the communication may be directed to private computing element 110 using the local private IP address for private computing element 110 and a port advertised in association with computing element 152. In response to receiving the communication, private computing element 110 may update addressing in the communication, including IP addresses and ports, wherein the IP addresses may comprise addresses allocated by coordination service 120 to each device available in the private network. For example, computing element 150 may be allocated a first unique address for the private network, while computing element 152 may be allocated a second unique address for the private network. Once the addressing is updated, private computing element 110 may encapsulate the communication to be communicated over internet 160 to private computing element 111. After receiving the encapsulated communication, private computing element 111 may decapsulate the communication, update addressing in the packet in association with the local network and forward the communication to computing element 152.

While demonstrated in the previous example as communicating between two computing elements that have not directly registered with the coordination service, similar operations may be implemented when a registered private computing element communicates a packet over the internet. For example, a communication from private computing element 110 may use addressing associated with the private network (e.g., unique IP addresses allocated by coordination service 120) to communicate over internet 160. The communication may be encapsulated using encryption information from coordination service 160 and public addressing information from coordination service 120 to forward the communication over the internet to a registered computing element in the private network.

In some implementations, in advertising computing elements from the other local network, private computing element 110 may request and receive multiple local IP addresses, such that private computing element 110 may appear as multiple computing elements. For example, private computing element may advertise as itself using a first local IP address and may advertise as other computing elements in local networks 141-142 using additional local IP addresses. As an example, if computing element 150 requests to communicate with private computing element 111, computing element 150 may use a local IP address advertised by private computing element 110 for private computing element 111. Once the communication is received by private computing element 110, private computing element 110 may translate the local IP address to a private network IP address allocated by coordination service 120 to private computing element 111. In some examples, computing element 110 may maintain one or more data structures that associate local IP addresses to unique private IP addresses allocated by the coordination service. Private computing element 110 may then encapsulate the communication and forward the communication to private computing element 111. Private computing element 111 may then decapsulate the packet and identify the destination private network IP address corresponds to itself. Private computing element 111 may then process the packet using applications and services on the computing element.

Although demonstrated in the previous example using IP addresses, private computing element 110 may advertise as multiple computing elements using specific ports allocated to the computing elements. For example, private computing element 110 may advertise computing elements 152-153 in local network 140 using specific ports for each of the computing elements. When a packet is received on one or the ports, private computing element 110 may process the packet in accordance with that computing element.

Figure 3:
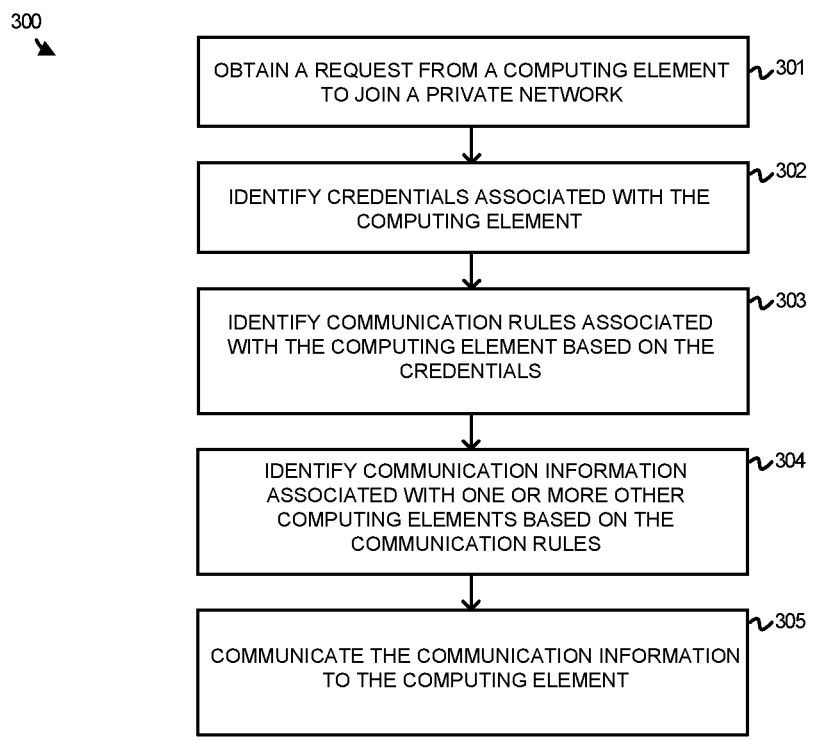
FIG. 3 illustrates an operation of a coordination service to manage private networks according to an implementation.

FIG. 3 illustrates an operation 300 of a coordination service to manage private networks according to an implementation. The steps of operation 300 are referenced parenthetically in the paragraphs that follow with reference to systems and elements of computing environment 100 of FIG. 1.

As depicted, operation 300 includes obtaining (301) a request from a computing element to join a private network and, in response to the request, identifying (302) credentials associated with the computing element. The credentials may comprise username and password information, a token associated with the user, device information, or some other credentials associated with the computing element. Once the credentials are identified, operation 300 may identify (303) communication rules associated with the computing element based on the credentials and identify (304) communication information associated with other computing elements based on the communication rules. In some examples, the communication rules may be used to associate credentials of the user with other computing elements available to the user. In some implementations, a user type (associated with the user, e.g., attorney, parent, etc.) and/or device type for registering computing element may be used to identify other user types and/or device types available for communication with the registering computing element. The rules may further limit the types of communications that are permitted, the services that are available on each of the computing elements, or some other limitation. Once the rules are identified, communication information for computing elements that satisfy the criteria of the rules may be identified. Operation 300 may then (305) communicate the communication information to the computing element, wherein the communication information may include addressing information (IP addresses, ports, etc.), encryption information, or some other information to permit the registering computing element to communicate with other computing elements.

In some implementations, when a computing element, such as private computing element 110, registers with coordination service 120, the computing element may provide addressing and encryption information to permit other computing elements to communicate with the registering computing element. In some examples, the registering computing element may further provide information about other computing elements available via the local network, wherein the registering computing element may communicate with the other elements on the local network. For example, private computing element 110 may provide addressing and encryption information for itself and may further provide device information associated with computing elements 150-151 to coordination service 120. This information may include device type, a device identifier, or some other information, wherein the information may be used to determine whether the computing element can communicate in the private network. When the information is provided, coordination service 120 may allocate unique addresses to the various computing elements that are permitted to communicate over the network. Thus, each computing element in local network 140 may be allocated a different unique IP address for the private network, permitting computing elements in other local networks to communicate using the unique IP addresses.

As an illustrative example, private computing element 110 may provide device information about computing element 150 to coordination service 120. Coordination service 120 may determine a unique IP address for the computing element and provide the unique IP address to private computing elements 111-112 along with other information associated with computing element 150 (e.g., device identifier, device type, IP address for private computing element 110 providing the encapsulation operations, etc.). Once received at private computing element 111, private computing element 111 may advertise computing element 150, wherein advertising the computing element may include allocating one or more ports on private computing element 111 to receive communications associated with computing element

150. When a packet is received from computing element 150 directed at computing element 150, the packet may use the allocated port and the local IP address for computing element 150. As the communication was received on the port for computing element 150, private computing element 111 may process the packet to translate the destination IP address to that of computing element 150 allocated by coordination service 120 and may further update port information, or some other information in the packet. Once the modifications are made to the packet, the packet may be encapsulated and forwarded to private computing element 110. In response to receiving the packet, private computing element 110 may decapsulate the packet and update the addressing of the packet prior to forwarding the packet to computing element 150. This update may replace the source IP address of the packet with the local IP address for private computing element 110, may replace the destination IP address with the local IP address for computing element 150, may replace a source port with the port that is used to advertise computing element 152 to computing element 150, or may provide some other modification to the addressing of the packet. Once modified, the packet may be forwarded and received by computing 150 as though the packet was communicated from computing element 152 within local network 140.

In some examples, one or more of private computing elements 110-112 may move from one local network to another or may identify new computing elements as they join a local network or are removed from the local network. As a result, private computing element 110 may update coordination service 120 of changes in the available computing elements. Coordination service 120 may then distribute information about the available computing elements to other computing elements in the private network to update the communication information locally cached. Thus, if private computing element 110 identified that computing element 151 were no longer in local network 140, a notification may be provided to coordination service 120. In response to the notification, coordination service may distribute a notification to private computing elements 111-112 to remove any communication information associated with computing element 111.

Figure 4:
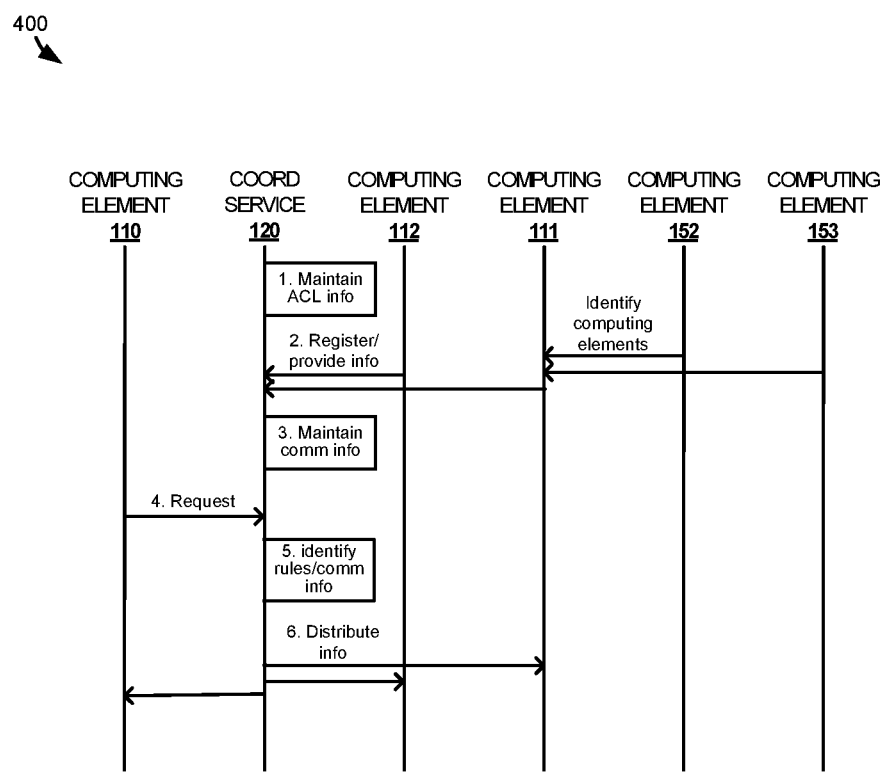
FIG. 4 illustrates a timing diagram to distribute communication information to computing elements according to an implementation.

FIG. 4 illustrates a timing diagram 400 to distribute communication information to computing elements according to an implementation. Timing diagram 400 includes private computing elements (computing elements) 110-112, coordination service 120, and computing elements 152-153 from computing environment 100 of FIG. 1.

As depicted, at step 1, coordination service 120 maintains ACL information, which comprises rules for a private computing network over multiple local networks. Each of the rules may indicate users and/or device types that are permitted to communicate in the private network, the types of communications that are permitted between the different computing elements, or some other information associated with managing rules for the private network. The rules may be generated by one or more administrators for the network. As the rules are maintained, computing elements 111-112 register with coordination service 120 at step 2. In registering with coordination service 120, each of the computing elements may provide information about the user of the computing elements 111-112, device information about computing elements 111-112, or some other identifiable information. From the information, coordination service 120 may identify communication rules that apply to computing elements 111-112 and identify communication information to be distributed to each of the computing elements. The communication information may include addressing and encryption information to permit computing elements to communicate based on the rules. Once identified, the communication information is distributed to computing elements 111-112.

Here, in addition to providing information about a single computing element, computing element 111 further identifies computing elements 152-153 on the same local network. Information about the computing elements may be provided to coordination service 120 that can then be used to distribute to other registered computing element, permitting computing elements 152-153 to communicate in the private network via computing element 111. In some examples, the information provided may include a device identifier, device type, or some other information associated with computing elements 152-153 that can be discovered on the local network, sometimes using zero-configuration networking. Once the information is provided, coordination service 120 may allocate a unique IP address in the private network to each of the computing elements and distribute the unique IP addresses to other registered computing elements.

For example, when computing element 152 generates a packet to be sent to computing element 110, computing element 152 may communicate the packet to computing element 111 using the local IP address for computing element 111 and a port used to advertise computing element 112 in the local network. In response to receiving the packet, computing element 111 may modify the addressing, such that the destination IP address is the unique IP address allocated by coordination service 120 and, in some cases, the destination port for the communication. Once modified, the packet is encapsulated and communicated over the internet to computing element 112, wherein computing element 112 may decapsulate the packet and process the packet locally.

Although demonstrated as using ports to advertise the additional computing elements, the advertising of computing elements may use local IP addresses in some examples. In some implementations, computing element 111 may request and receive local IP addresses for itself and other computing elements in the private network that are not local (i.e., computing element 112). For example, computing element may advertise to computing elements 152-153 a first local IP address that represents itself and may further advertise a second local IP address that represents computing element 112. When a communication is received by computing element 111, computing element may identify the destination IP address and determine whether computing element 111 or computing element 112 is the destination. If computing element 112 is the destination, computing element 111 may perform address translation to translate the local IP address to the unique private IP address associated with computing element 112. The packet may then be encapsulated and communicated over the internet using public IP addressing. Once received, computing element 112 may decapsulate and process the packet.

After the computing elements are registered, coordination service 120 may maintain, at step 3, the communication information for the various computing elements, including updates to addressing, available computing elements, encryption, or some other updates. Coordination service 120 may further distribute updates to the private computing elements or computing elements registered with the coordination service to ensure updated communication availability for the computing elements.

As the communication information is maintained for the private network, computing element 110 may generate a request, at step 4, to join the private network. In response to the request, coordination service 120 identifies, at step 5, communication rules associated with the request and identifies communication information for other computing elements based on the communication rules. Once the communication information is determined, the communication information is distributed, at step 6, to relevant computing elements in the private network that have registered with the coordination service. The communication information provided to computing element 110 may include information to communicate with computing elements 111-112 and further to communicate with computing elements 152-153 via computing element 111.

In some implementations, when a computing element registers with the coordination service, the computing element may provide communication information associated with itself and one or more other computing elements on the same local network. The communication information may include addressing information for the computing element, encryption information for the computing element, device type information for the other computing elements on the local network, device identifier information for the other computing elements on the local network, or some other similar information. At least a portion of this information may then be distributed to other computing elements registered in the private network to communicate with the newly registered computing element and any ACL approved computing elements behind the registered computing element.

Figure 5:
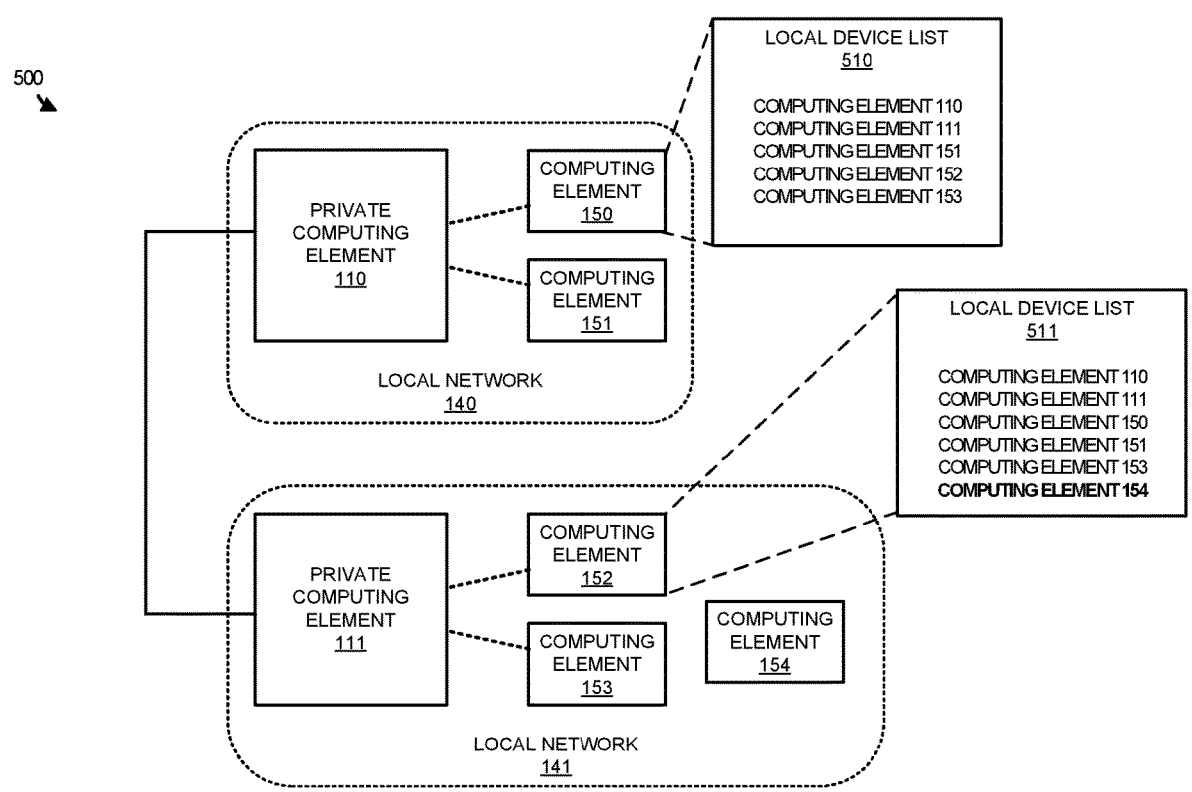
FIG. 5 illustrates an operational scenario of a computing environment to manage private networks according to an implementation.

FIG. 5 illustrates an operational scenario 500 of a computing environment to manage private networks according to an implementation. Operational scenario 500 includes local networks 140-141, private computing elements 110-111, and computing elements 150-154 from computing environment 100 of FIG. 1. Operational scenario 500 further includes local device lists 510-511 that demonstrate devices advertised as local over the network.

As described herein, computing elements may register with a coordination service to communicate via a private network that spans multiple local networks. These computing elements may include an application or service that works in conjunction with the coordination service to provide the private network. When registered, the coordination service may identify communication information for the registering computing element and provide the communication information to the computing element. The communication information may correspond to one or more other computing elements that the registering computing element is permitted to communicate. The communication information may include IP addressing information, available ports, available communication types, encryption information, or some other communication information.

As described herein, one computing element in a computing network may act as an intermediary to permit other computing elements in the same local network to communicate using the private communication information from the coordination service. Here, private computing element 110 receives communication information to communicate with private computing element 111, but also receives information to communicate with computing elements 152-153 via private computing element 111. Private computing element 110 may advertise to computing elements 150-151 a port, identifier information, or some other information associated with private computing element 111 and computing elements 152-153. As a result, computing element 150 includes a local device list 510 that permits computing element 150 to communicate with private computing elements 110-111 and computing elements 151-153.

When a communication is required to computing element 152, private computing element 110 may identify a received packet from computing element 150, wherein the packet may include the destination local IP address for private computing element 110 and a port that is associated with computing element 152 (or some other information). In response to identifying that the destination is over the internet, private computing element 110 may modify addressing in the packet to place the packet in accordance with the private network. The modification may include changing the IP addressing (e.g., addressing associated with the private network), ports, or some other modification for the packet. For example, a modification to a packet received from computing element 150 may change the IP addresses to private addresses associated with computing element 152 and may modify source and destination port information if required by computing element 152. Once modified, private computing element 110 may encapsulate the packet for transmission over the internet, wherein the encapsulation may use the public IP address associated with private computing elements 110-111, ports available for private computing elements 110-111 or some other information. When the packet is received at private computing element 111, private computing element 111 may decapsulate the packet, update addressing in the decapsulated packet for the local network and forward the packet to computing element 152.

As depicted, in some examples, the communication rules of the coordination service may limit what computing elements on a local network may communicate via the private network. Here, while computing elements 152-153 are permitted to communicate in the private network using private computing element 111, computing element 154 is not permitted. This may be a result of private computing element 111 limiting the advertising to computing elements approved by the coordination service. Additionally, if a packet is received from computing element 154, the computing element may be blocked from using the private network.

In the example of operational scenario 500, local device list 511 for computing element 152 contains the same computing elements as local device list 510 with the addition of information for computing element 154. While computing element 154 may not be permitted to communicate via the private network information, the computing element may communicate and advertise itself locally within local network 141.

In some implementations, private computing elements 110-111 may update the coordination service about addressing changes, available computing elements, or some other information associated with the computing elements in a local network. These updates may be provided periodically, when a device is added or removed, when a device changes IP addresses, or at some other interval. In some implementations, the private computing element may change local networks (e.g., home to a friend's house) and may update the coordination service about computing elements identified on the local network. The coordination service may then identify rules and communication information to permit or block communications for the various computing elements.

In some implementations, in advertising the computing elements, each computing element of private computing elements 110-111 may use multiple local IP addresses, wherein each of the local IP addresses correspond to a computing element in the other local network. For example, private computing element 110 may advertise a first local IP address to communicate with applications and services for computing element 110. Additionally, private computing element 110 may advertise two additional local IP addresses that each correspond to a computing element of computing elements 152-153. When a communication is required to computing element 152, computing element 150 may use the local IP address allocated for computing element 152 to communicate the packet to private computing element 110. In response to receiving the packet, private computing element 110 may perform network address translation to translate the local IP address to a unique private IP address allocated for the private network by the coordination service. Additionally, private computing element 110 may encapsulate the packet and communicate the packet over the internet to private computing element 111. After receiving the packet, private computing element 111 may decapsulate the packet and perform network address translation to translate the unique private IP address to a local IP address for computing element 152 in local network 141. Once translated, the packet may be forwarded to computing element 152 for processing.

Although described in the previous example as advertising multiple IP addresses, private computing systems 110-111 may advertise ports to represent different available computing elements. For example, computing element 110 may advertise a single IP address, but advertise one or more ports for communications with computing element 152 and one or more ports for communications with computing element 153. When a packet is received on one of the allocated ports, private computing element 110 may perform encapsulation operations to forward the packets toward private computing element 111.

Figure 6:
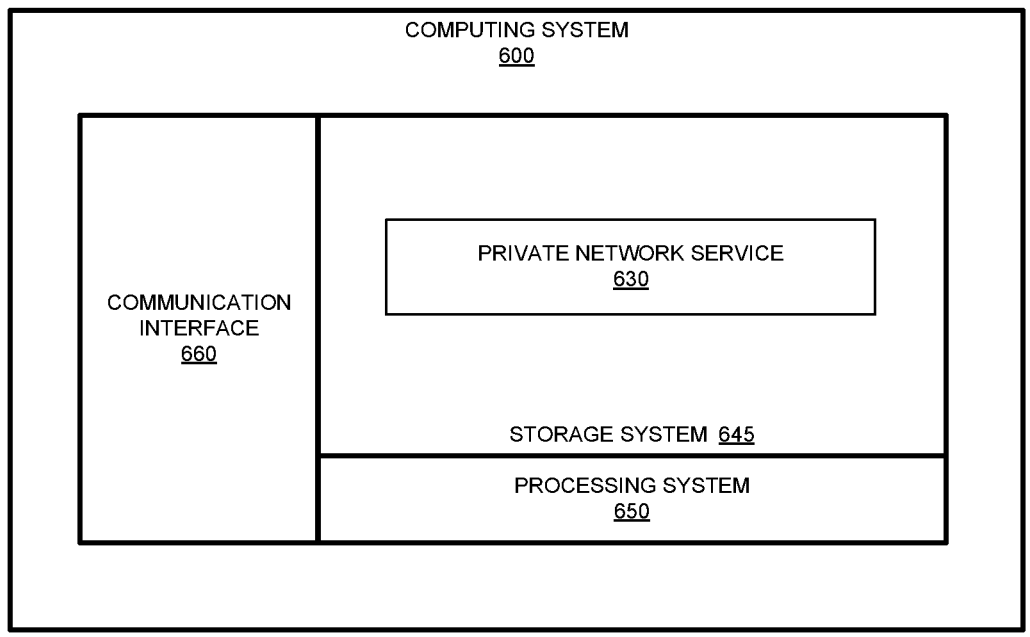
FIG. 6 illustrates a computing system in a private network according to an implementation.

FIG. 6 illustrates a computing system 600 in a private network according to an implementation. Computing system 600 is representative of any computing system or systems with which the various operational architectures, processes, scenarios, and sequences disclosed herein for a computing element can be implemented. Computing system 600 is an example computing element of private computing elements 110-112, although other examples may exist. Computing system 600 includes storage system 645, processing system 650, and communication interface 660. Processing system 650 is operatively linked to communication interface 660 and storage system 645. Communication interface 660 may be communicatively linked to storage system 645 in some implementations. Computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 may be configured to communicate with computing elements in the same private network, a coordination service, and an intermediary relay server, wherein the relay server can support connections between computing elements. For example, the relay server may be used to support connections where a firewall may block connections directly between computing elements.

Processing system 650 comprises microprocessor and other circuitry that retrieves and executes operating software from storage system 645. Storage system 645 may include volatile and nonvolatile, removable and non-removable media implemented in any method or technology for storage of information, such as computer readable instructions, data structures, program modules, or other data. Storage system 645 may be implemented as a single storage device but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises private network service 630 capable of providing at least operation 200 of FIG. 2. The operating software on storage system 645 may further include an operating system, utilities, drivers, network interfaces, applications, or some other type of software. When read and executed by processing system 650, the operating software on storage system 645 directs computing system 600 to operate as described herein.

In at least one implementation, private network service 630, which may comprise an application on computing system 600, directs processing system 650 to communicate a request to a coordination service to join a private network. Private network service 630 further receives communication information associated with one or more other computing elements in the private network, wherein the communication information permits the computing system to communicate with one or more other computing elements in the private network, and wherein the one or more other computing elements connect to the internet using one or more second local networks. The other computing elements may comprise desktop computers, routers, laptops, or some other computing element. The communication information may include addressing information, encryption information, or some other information associated with the other computing elements.

Once the information is received, private computing service 630 directs processing system 650 to advertise the one or more other computing elements in the first local network as though the one or more other computing elements are connected to the first local network. The advertising of the other computing elements may include advertising a port on computing system 600 as associated with the other computing elements. Thus, computing system 600 may advertise itself in the local network with one or more available ports and may further advertise ports for one or more other computing systems in other local networks. When a communication is required by another computing element on the local network, the other computing element may transfer the packet to the appropriate port on computing system 600. In response to receiving the packet, computing system 600 may determine whether the communication is permitted based on the communication information from the coordination service, may modify addressing in the packet to place the packet in accordance with the private network, and may encapsulate the packet for communication to another computing element in the private network.

In some implementations, computing system 600 may receive a communication destined for another computing element in the local network. When received, private network service 630 may decapsulate the packet using communication information provided from the coordination service, modify addressing information in the packet to bring the packet in accordance with the local network (translate IP addresses and/or ports), and forward the packet to the destination computing element. In some examples, the translation may translate IP addresses allocated by the coordination service to IP addresses associated with the local network.

Although demonstrated in the previous examples as communicating packets for other computing elements on the local network, computing system 600 may communicate packets to other computing elements in the private network. These other computing elements may include elements that have registered with the private network via the coordination service or computing elements that are permitted to communicate on the private network using a passthrough or intermediary computing element that registered with the coordination service. When a packet is identified to be communicated, computing system 600 may use addressing associated with the private network to update the packet and encapsulate the packet using the public addressing associated with a registered computing element for the destination of the packet.

Figure 7:
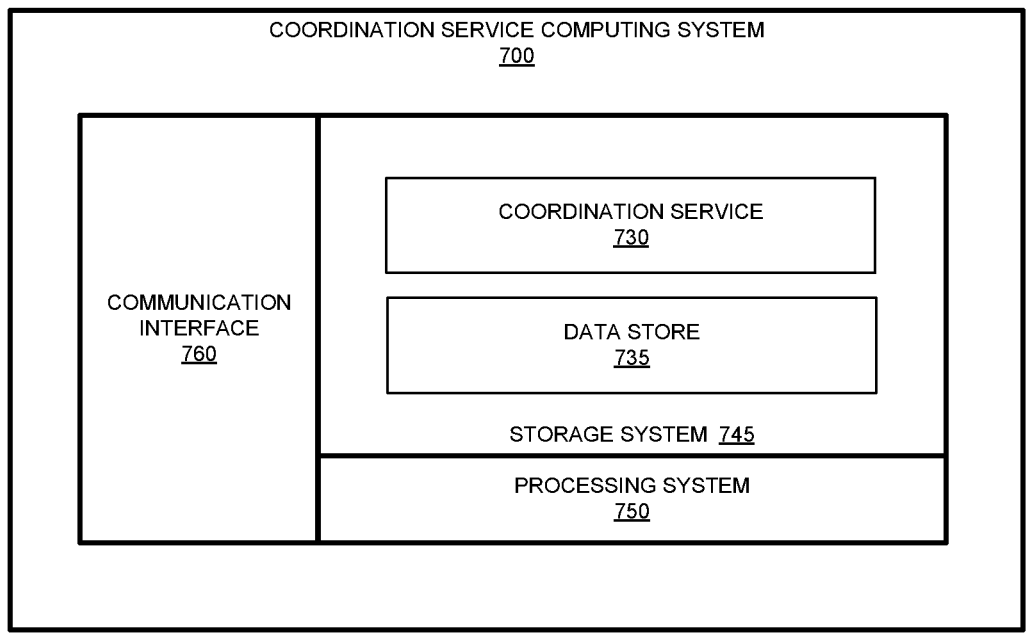
FIG. 7 illustrates a coordination service computing system to manage private networks according to an implementation.

FIG. 7 illustrates a coordination service computing system 700 to manage private networks according to an implementation. Computing system 700 is representative of any computing system or systems with which the various operational architectures, processes, scenarios, and sequences disclosed herein for a coordination service can be implemented. Computing system 700 is an example of coordination service 120 of FIG. 1, although other examples may exist. Computing system 700 includes storage system 745, processing system 750, and communication interface 760. Processing system 750 is operatively linked to communication interface 760 and storage system 745. Communication interface 760 may be communicatively linked to storage system 745 in some implementations. Computing system 700 may further include other components such as a battery and enclosure that are not shown for clarity.

Communication interface 760 comprises components that communicate over communication links, such as network cards, ports, radio frequency (RF), processing circuitry and software, or some other communication devices. Communication interface 760 may be configured to communicate over metallic, wireless, or optical links. Communication interface 760 may be configured to use Time Division Multiplex (TDM), Internet Protocol (IP), Ethernet, optical networking, wireless protocols, communication signaling, or some other communication format—including combinations thereof. Communication interface 760 is configured to communicate with physical and/or virtual computing elements in one or more private networks.

Processing system 750 comprises microprocessor and other circuitry that retrieves and executes operating software from storage system 745. Storage system 745 may include volatile and nonvolatile, removable and non-removable media implemented in any method or technology for storage of information, such as computer readable instructions, data structures, program modules, or other data. Storage system 745 may be implemented as a single storage device but may also be implemented across multiple storage devices or sub-systems. Storage system 745 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 750 is typically mounted on a circuit board that may also hold the storage system. The operating software of storage system 745 comprises computer programs, firmware, or some other form of machine-readable program instructions. The operating software of storage system 745 comprises coordination service 730 capable of providing at least operation 300 of FIG. 3. The operating software on storage system 745 may further include an operating system, utilities, drivers, network interfaces, applications, or some other type of software. When read and executed by processing system 750, the operating software on storage system 745 directs computing system 700 to operate as described herein.

In at least one implementation, coordination service 730 directs processing system 750 to obtain a request from a computing element to join a private network, wherein the private network is managed via the coordination service. In response to the request, coordination service 730 directs processing system 750 to identify communication rules associated with the registering computing element and determine communication information for one or more other computing elements based on the communication rules. In some examples, coordination service 730 may maintain ACLs or a rule list that indicates what user identifiers or types, device types, and other user or device related information are permitted to communicate and the types of communications that are permitted. From the identified rules, computing system 700 may determine one or more other computing elements that correspond to the rules and communication information for the one or more other computing elements. The rules and communication information may be stored in data store 735. As an example, a rule may permit a first user type to communicate with a second user type. Accordingly, if a computing element with a first user type registers with the coordination service, the coordination service may identify communication information associated with computing elements with the second user type. Once the communication information is identified, the communication information may be distributed to the registering computing element. Additionally, communication information may also be provided to the one or more other computing elements, permitting the one or more other computing elements to communicate with the newly registering computing element.

In some implementations, the communication information maintained may comprise information for computing elements that actively register and execute a service or application that implements the private networking operations (encapsulation, network address translation, encryption, and the like). The communication information may also include information for one or more computing elements that use a registered computing element to communicate with computing elements on other local networks. For example, a desktop computing system may register with the coordination service and permit one or more other devices on the local network to communicate over the private network. The communication information for the one or more other devices on the local network may include a device identifier, ports available for the one or more other devices, a unique IP address allocated by the coordination service for use in the private network (allocated to available devices for the network), or some other information. A computing element on a separate local network may advertise the desktop computing system (using a device identifier and port) and may also advertise the one or more other devices that communicate via the desktop computing system. In advertising the devices, the computing element may advertise ports that are available to communicate with the devices on the other network and may impersonate the devices to make them appear as though they are on the local network.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a computing element in a first local network, the method comprising:
    communicating a request to a coordination service to join a private network;
    receiving communication information associated with one or more other computing elements in the private network, wherein the communication information permits the computing element to communicate with one or more other computing elements in the private network, and wherein the one or more other computing elements connect to an internet using one or more second local networks;
    advertising, by the computing element in the first local network, the one or more other computing elements in the first local network as though the one or more other computing elements are connected to the first local network, wherein advertising the one or more other computing elements in the first local network comprises:
    obtaining one or more local internet protocol (IP) addresses for advertising in the first local network, wherein each of the one or more local IP addresses is allocated to one of the one or more other computing elements in the one or more second local networks, and
    advertising the one or more local IP addresses in the first local network, wherein the one or more local IP addresses direct packets to the computing element in the first local network;
    receiving, at the computing element, a data packet addressed to a first local IP address of the one or more local IP addresses, wherein the first local IP address is allocated to a first of the one or more other computing elements; and
    translating, at the computing element, the first local IP address to a network IP address associated with the first of the one or more other computing elements.

2. The method of claim 1, wherein communicating the request to the coordination service comprises communicating the request to the coordination service with user and/or device credentials.

3. The method of claim 1 further comprising:
    identifying one or more additional computing elements connected to the first local network; and
    communicating metadata associated with the one or more additional computing elements to the coordination service.

4. The method of claim 3 further comprising:
    encapsulating, at the computing element, the data packet; and
    communicating, at the computing element the encapsulated data packet.

5. The method of claim 3, wherein the metadata comprises addressing information or device identifier information associated with the one or more additional computing elements.

6. The method of claim 4, wherein communicating the encapsulated data packet comprises communicating the encapsulated data packet to the computing element of the one or more additional computing elements.

7. The method of claim 3, wherein the data packet is a first data packet, the method further comprising:
    receiving a second data packet;
    decapsulating the second data packet;
    translating a unique destination IP address in the decapsulated second data packet to a local IP address associated with a computing element of the one or more additional computing elements; and
    forwarding the decapsulated second data packet to the computing element of the one or more additional computing elements.

8. The method of claim 3, wherein the data packet is a first data packet, the method further comprising:
    receiving a second packet;
    decapsulating the second packet;
    determining that a unique destination IP address in the decapsulated second packet corresponds to the computing element; and
    processing the second packet in the computing element.

9. The method of claim 1, wherein the computing element comprises a desktop computer, laptop computer, or router.

10. A computing apparatus in a first local network, the computing apparatus comprising:
    one or more processors; and
    one or more memories operably coupled to the one or more processors and having stored thereon program instructions that, upon execution by the one or more processors, cause the one or more processors to:
        communicate a request to a coordination service to join a private network;
        receive communication information associated with one or more other computing elements in the private network, wherein the communication information permits the computing apparatus to communicate with one or more other computing elements in the private network, and wherein the one or more other computing elements connect to an internet using one or more second local networks;
        advertise, by the computing apparatus in the first local network, the one or more other computing elements in the first local network as though the one or more other computing elements are connected to the first local network, wherein advertising the one or more other computing elements in the first local network comprises:

obtaining one or more local internet protocol (IP) addresses for advertising in the first local network, wherein each of the one or more local IP addresses is allocated to one of the one or more other computing elements in the one or more second local networks, and advertising the one or more local IP addresses in the first local network, wherein the one or more local IP addresses direct packets to the computing apparatus in the first local network; and receive, at the computing element apparatus, a packet addressed to a first local IP address of the one or more local IP addresses, wherein the first local IP address is allocated to a first of the one or more other computing elements; and translate, at the computing apparatus, the first local IP address to a network IP address associated with the first of the one or more other computing elements.

11. The computing apparatus of claim 10, wherein communicating the request to the coordination service comprises communicating the request to the coordination service with user and/or device credentials.

12. The computing apparatus of claim 10, wherein the program instructions further direct the one or more processors to:

identify one or more additional computing elements connected to the first local network; and communicate metadata associated with the one or more additional computing elements to the coordination service.

13. The computing apparatus of claim 12, wherein the program instructions further direct the one or more processors to:

encapsulate the packet; and
communicate the encapsulated packet.

14. The computing apparatus of claim 12, wherein the metadata comprises addressing information or device identifier information associated with the one or more additional computing elements.

15. The computing apparatus of claim 13, wherein communicating the encapsulated packet comprises communicating the encapsulated packet to the computing apparatus of the one or more additional computing elements.

16. The computing apparatus of claim 12, wherein the packet is a first packet, and wherein the program instructions further direct the one or more processors to:

receive a second packet;
decapsulate the second packet;
translate a unique destination IP address in the decapsulated second packet to a local IP address associated with a computing element of the one or more additional computing elements; and
forward the decapsulated second packet to the computing element of the one or more other computing elements.

17. The computing apparatus of claim 12, wherein the packet is a first packet, and wherein the program instructions further direct the one or more processors to:

receive a second packet;
decapsulate the second packet;
determine that a unique destination IP address in the decapsulated second packet corresponds to the computing apparatus; and
process the second packet in the computing apparatus.

18. The computing apparatus of claim 10, wherein the computing apparatus comprises a desktop computer, laptop computer, or router.

19. A method operating a first computing element in a first local network, the method comprising:

communicating a request to a coordination service to join a private network;

receiving communication information associated with one or more other computing elements in the private network, wherein the communication information permits the first computing element to communicate with one or more other computing elements in the private network, and wherein the one or more other computing elements connect to an internet using one or more second local networks;

advertising, by the first computing element in the first local network, the one or more other computing elements in the first local network as though the one or more other computing elements are connected to the first local network, wherein advertising the one or more other computing elements in the first local network comprises:

obtaining one or more local internet protocol (IP) addresses for advertising in the first local network, wherein each of the one or more local IP addresses is allocated to one of the one or more other computing elements in the one or more second local networks, and advertising one or more local internet protocol (IP) addresses in the first local network, wherein the one or more local IP addresses direct packets to the first computing element in the first local network;

receiving, at the first computing element, a packet from a second computing element on the first local network addressed to a first local IP address of the one or more local IP addresses and directed at a third computing element in the one or more other computing elements in the one or more second local networks;

translating the first local IP address to a unique private IP address associated with the third computing element, wherein the unique private IP address is allocated by the coordination service and provided as part of the communication information;

encapsulating the packet based on the communication information; and communicating the encapsulated packet to the third computing element.

20. The method of claim 19 further comprising:

determining whether the packet is permitted based on the communication information; and wherein encapsulating the packet occurs in response to determining that the packet is permitted.

* * * * *